July 2, 1935.  L. L. JONES ET AL  2,007,054
PHONOGRAPH
Filed May 31, 1930    5 Sheets-Sheet 1
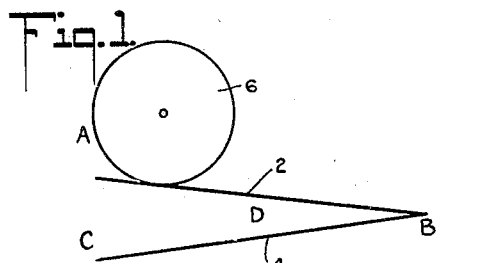
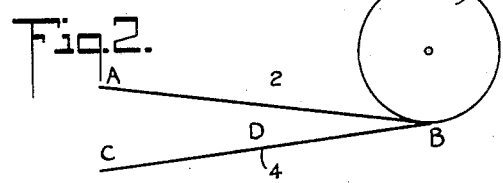
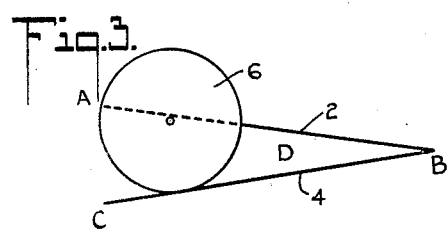
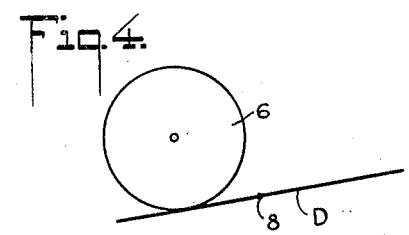
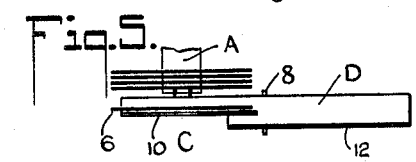
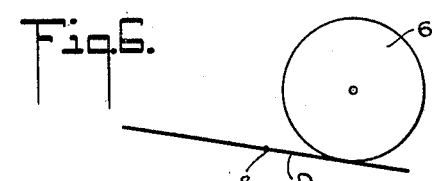
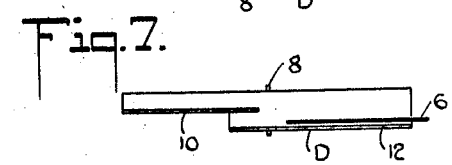
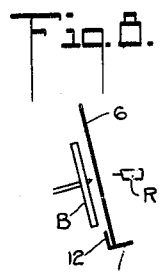
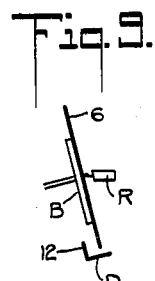
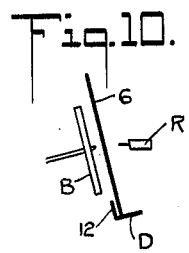
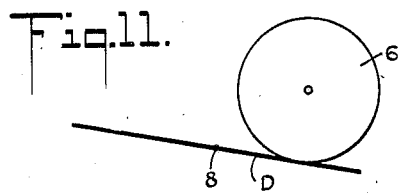
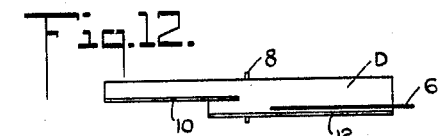
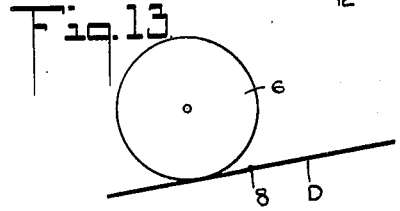
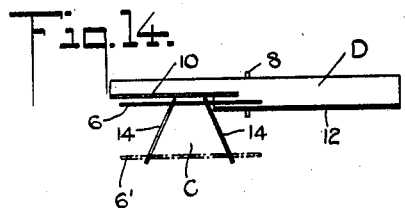
INVENTORS
JOSEPH JONES
LESTER L. JONES
BY THOMAS E. PIAZZE
ATTORNEYS

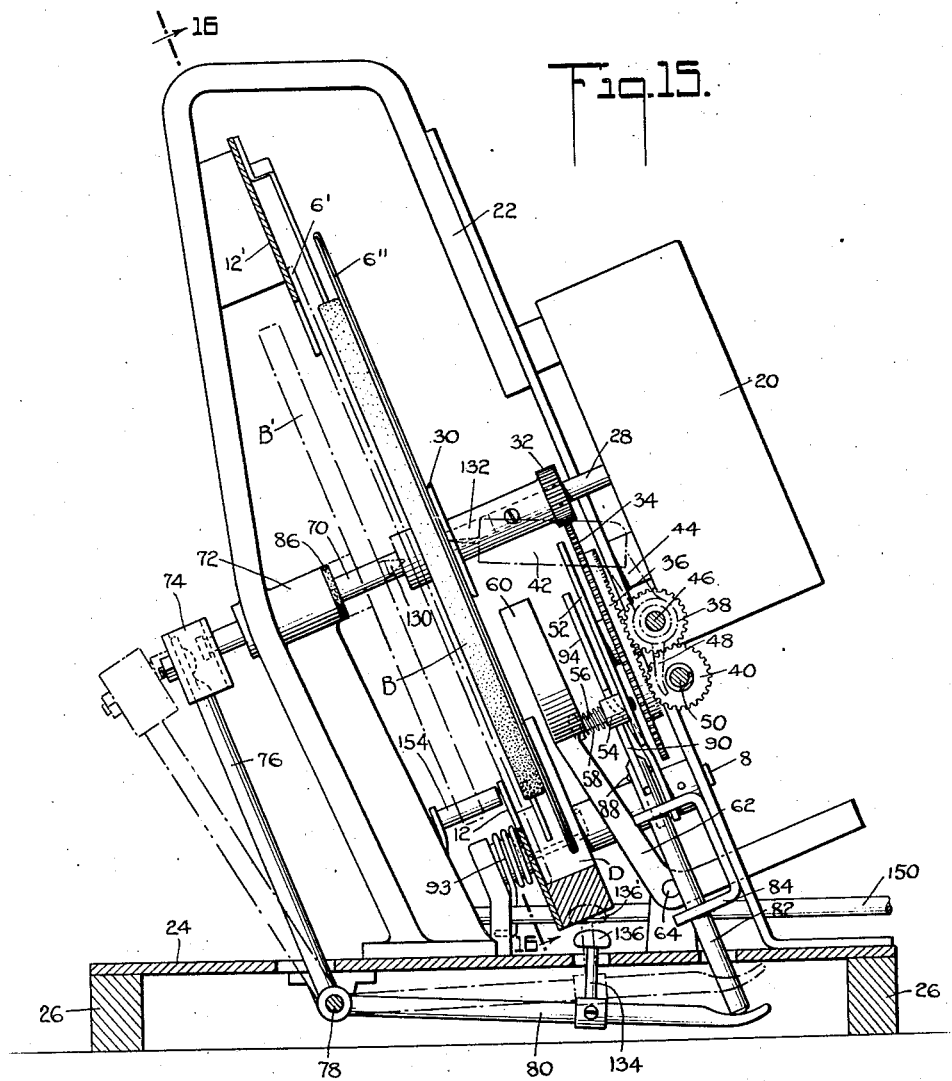

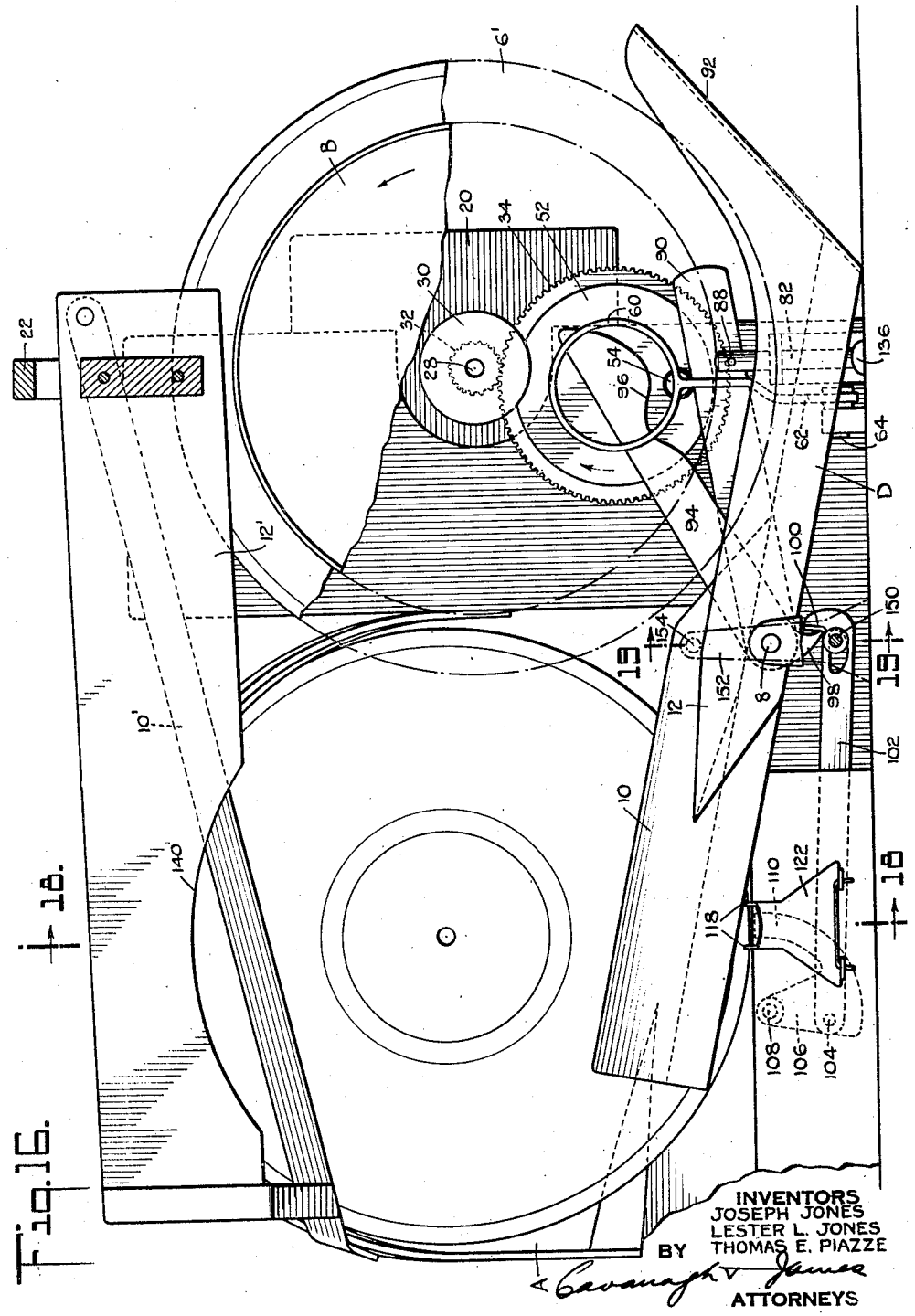

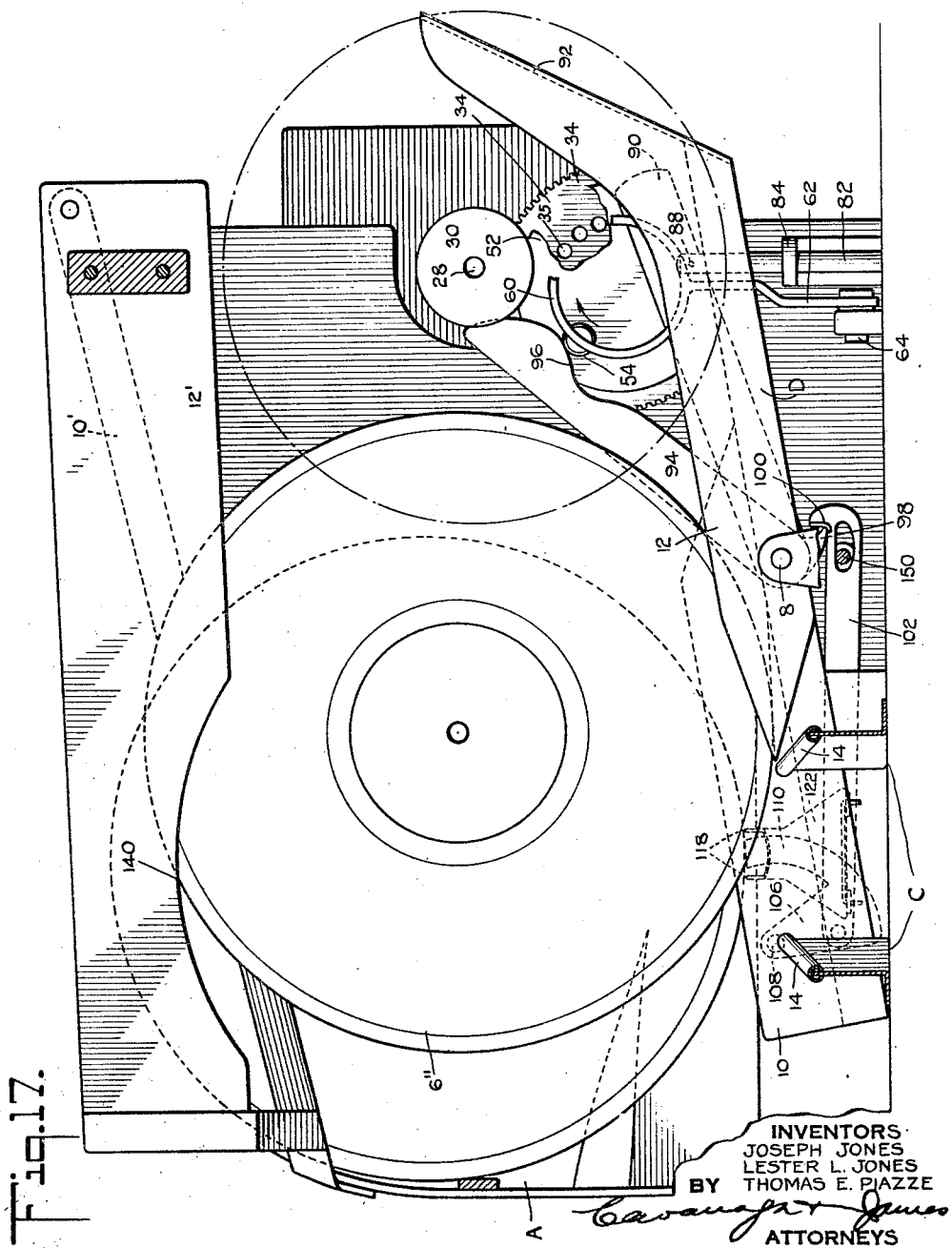

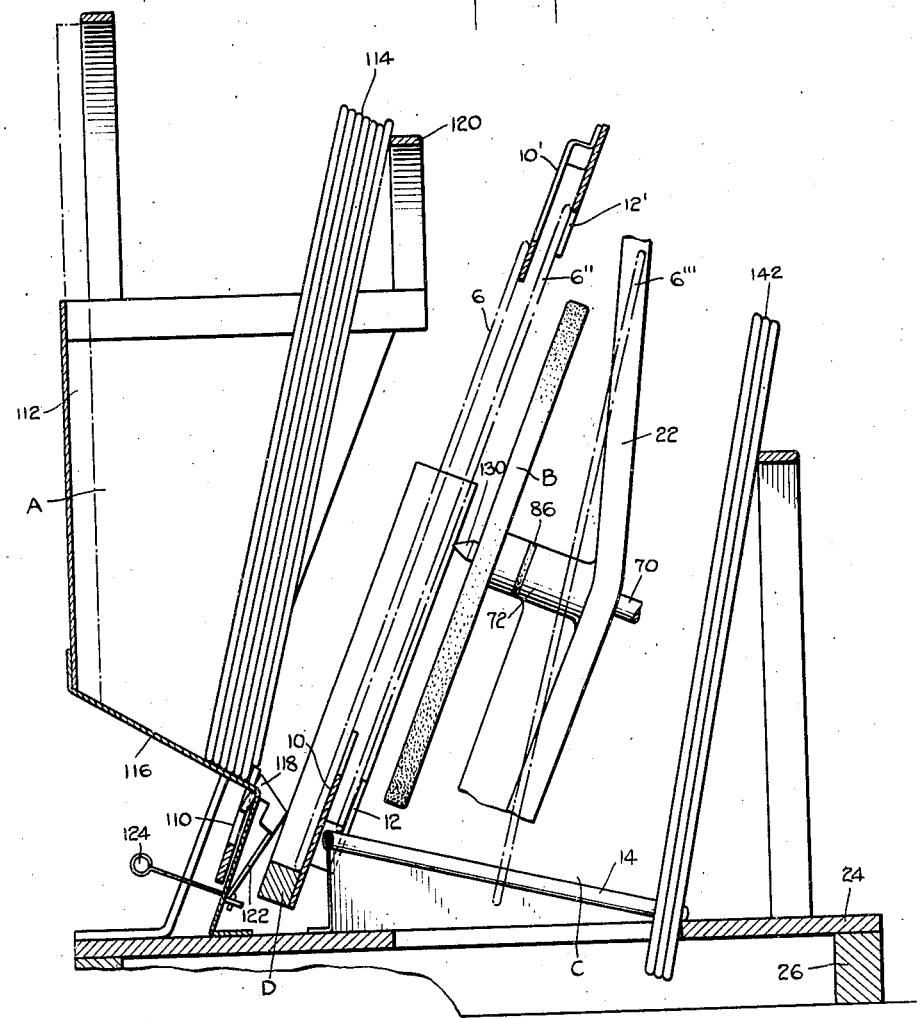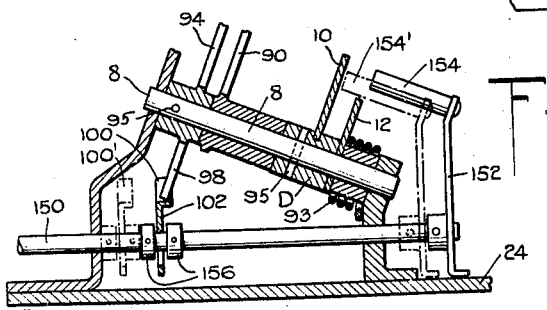

Patented July 2, 1935

2,007,054

UNITED STATES PATENT OFFICE 2,007,054

PHONOGRAPH

Lester L. Jones, Oradell, N. J., and Joseph Jones, Larchmont, and Thomas E. Piazze, Brooklyn, N. Y., assignors to Technidyne Corporation, New York, N. Y., a corporation of New York Application May 31, 1930, Serial No. 458,612

29 Claims. (Cl. 274—10)

This invention relates to phonographs and more particularly to automatic record changing phonographs.

The objects of the present invention, generally, are to improve the operation, simplify the mechanism, and decrease the space requirements of automatic record changing phonographs. To fulfil these objects we employ an arrangement which transfers records from a magazine to the phonograph mechanism or back again by permitting the record to roll on an inclined or sloping guide rail, preferably under the influence of gravity.

With this method of record transfer, the record is kept in the magazine and transferred toward or from the playing mechanism of the phonograph in a substantially upright position. We therefore find it desirable to also play the record in a substantially upright position, and further objects of our invention center about suitable mechanism for handling and reproducing a record while keeping the same in a substantially upright position. For this purpose we have found it desirable to arrange the record turntable with its axis inclined or tilted upward somewhat from the horizontal in order to facilitate the record loading operation and to simplify the reproducer supporting mechanism. Such an arrangement retains the advantage of an upright record in that the record may be transferred by rolling it on its periphery, and at the same time results in many of the advantages of playing the record in the more usual horizontal position inasmuch as the record may be supported in place by gravity while the turntable is advanced or retracted therefrom for the record loading or unloading operation, and in addition, the reproducer may be urged toward the face of the record to be played, by gravity.

Because of the fact that the record and record turntable are used in a nearly upright position, we find it desirable to clamp the record against the turntable by a clamping member during the playing of the record. This clamping member is arranged co-axially with the turntable so that by relative movement of the clamping member and the turntable, a record may be clamped therebetween. In accordance with further objects and features of our invention the rotatable clamping member is axially fixed in place and is geared to and constantly rotated by a suitable driving motor which may also be fixed in position, while the record turntable is mounted for free rotation, and is axially reciprocable toward and from the clamping member. With this arrangement a record to be played may be positioned between the turntable and clamping member, the turntable advanced toward the clamping member in order to load the record onto the turntable, and further advanced until the record is frictionally engaged by the clamping member, which brings the record into rotation. In this manner the loading operation, the clamping operation, and the starting operation of the record may all be accomplished by a single movement of the turntable. A centering pin is advanced into the center hole of the record during the loading operation in order to properly center the record, and while this movement of the centering pin may be accomplished in a number of ways, it is most simply accomplished simultaneously with the operations previously outlined by the simple provision of a centering pin having a tapered tip on the turntable itself.

Still another object of our invention is to accelerate the record changing operation by obtaining the desired engagement and disengagement of the reproducer with the record during the record changing operation itself. To this end we locate the reproducer along side of the clamping member and arrange it for reciprocation across the face of the table, and also for a limited reciprocation toward and from the table. In this manner, when the turntable and record are retracted from the clamping member, the reproducer cannot follow the record more than a limited distance and is therefore automatically disengaged from the record during the unloading operation. Similarly during the loading operation the record is brought into engagement with the reproducer as it is being moved into engagement with the clamping means.

Further objects of our invention center about the provision of appropriate means for transferring a record from a record supply magazine to a position between the turntable and clamping means and from its position between the turntable and clamping means to a discard magazine. It has previously been explained that this transfer is accomplished by an inclined or sloping guide rail so that the magazines may be located along side of the playing mechanism, thereby resulting in a phonograph chassis which is limited in height so that the chassis may very conveniently be placed in a cabinet having suitable amplifier and loud speaker equipment, or, if desired, in a cabinet having a radio receiving chassis, so as to provide a combination radio set and automatic record changing phonograph.

Another object of our invention is to limit the necessary height of the phonograph chassis. For this purpose we substitute in place of fixed inclined guide rails leading to and from the turntable, a single tiltable guide rail with suitable mechanism for so tilting the same as to guide a record from the supply magazine to the turntable or from the turntable to the discard magazine so that the supply and discard magazines may be arranged at substantially the same elevation and need not be staggered in elevation by the amount of the desired incline of the guide rails. At the same time, the supply and discard magazines may be located at opposite sides of the same end of the guide rail so as to reduce the length of the phonograph chassis.

Further objects of the present invention reside in the provision of suitable mechanism for accomplishing the desired reciprocation of the record turntable and oscillation of the guide rail, the provision of suitable record supply and record discard magazines, the provision of suitable repeat mechanism, and other mechanical features hereinafter described.

To the accomplishment of the foregoing and such other objects as will hereinafter appear, our invention consists in the phonograph elements and their relation one to the other as hereinafter are more particularly described in the specification and sought to be defined in the claims. The specification is accompanied by drawings in which:

Figs. 1–14 are explanatory of the operation of our phonograph;

Fig. 15 is an elevation of the turntable end of the phonograph;

Fig. 16 is a longitudinal elevational section taken in the plane of the line 16—16 in Fig. 15;

Fig. 17 is a view similar to Fig. 16 showing the parts in record discard relation;

Fig. 18 is a transverse section taken through the supply and discard magazines taken in the plane of the line 18—18 in Fig. 16; and Fig. 19 is a section taken in the plane of the line 19—19 in Fig. 16, and is illustrative of the repeat mechanism.

To clarify the theory underlying the operation of the present phonograph a series of schematic single line drawings are presented in Figs. 1–14. Considering first Figs. 1–3 and assuming a record supply magazine to be located at the point A, record playing mechanism to be located at the point B, and a record discard magazine to be located at the point C, it will be readily understood that by the provision of a guide rail system D comprising inclined rails 2 and 4, a record 6 may readily be transferred from the point A to the point B, as is indicated in Fig. 2, by permitting the same to roll down the inclined rail 2. After the record has been played by appropriate playing mechanism located at the point B, it may be unloaded and transferred to the discard magazine at the point C by permitting it to roll down the inclined rail 4 i. e., as is indicated in Fig. 3.

With this arrangement the phonograph chassis is approximately a single level machine inasmuch as the supply and discard magazines are located along side of the record playing mechanism instead of above or beneath the same. Such a single level arrangement is most convenient for readily incorporating the phonograph chassis in cabinets of available type and for combination with radio receiving sets. However, it will be observed that the height of the resulting phonograph chassis is greater than the essential height of a single magazine or of the phonograph playing mechanism, by reason of the staggered relation of the supply and discard magazines needed to obtain the desired slope of the rails 2 and 4. To obtain a more compact arrangement we have modified the fundamental idea illustrated in Figs. 1–3 and instead provide an arrangement which is schematically illustrated in Figs. 4–14.

In the improved arrangement the guide rail mechanism D consists of only a single rail pivoted at a point 8 located slightly above the lower level of the machine. A record to be played, 6, is separated from a supply of records in a record supply magazine A and deposited upon the lower end of the rail D, as is illustrated in elevation and plan in Figs. 4 and 5 respectively. The record 6 is prevented from moving directly into the discard magazine located at C by a fin or guide 10. The rail D is then oscillated about the fulcrum 8 to elevate the magazine end of the rail and depress the turntable end of the rail, thereby causing the record 6 to roll down toward the turntable, as is illustrated in elevation and plan in Figs. 6 and 7 respectively. The record at this time is supported and guided by an upright fin 12. The record is handled and played in an inclined position which tends always to move it toward the fins 10 and 12, this incline being evident in Figs. 8, 9, and 10.

The manner in which the record is loaded upon the turntable B, and played, is schematically shown in Figs. 8, 9, and 10. In Fig. 8 the record 6 is shown resting upon the end of the rail D between the turntable B on the one side, and the reproducer R, and, if desired, clamping means, not shown, on the other side. The turntable B is then advanced until its centering pin enters the center hole of the record, and the record is carried into contact with the reproducer R. The rail D may, if desired, at the same time be further lowered, as is illustrated in Fig. 9. When the record has been played, the turntable B is retracted, thereby disengaging the record 6 from the reproducer R, and upon further movement, disengaging the turntable B from the record which meanwhile is supported upon the rail D.

The record is then in the position illustrated in elevation and plan in Figs. 11 and 12 respectively, whereupon the rail D is again oscillated about the fulcrum 8 until the turntable end of the rail is elevated and the magazine end of the rail is depressed, which causes the record to roll downwardly along the guide 12 and behind the guide 10 into the discard magazine C, as is illustrated in elevation and plan in Figs. 13 and 14, respectively. The discard magazine C is preferably provided with inclined supporting rails 14 so arranged that the record 6 slides toward the far side of the magazine to the dotted position marked 6'. Meanwhile the operation of Figs. 4 and 5 is repeated.

With this preliminary explanation of the arrangement and operation of the machine in mind, attention may next be directed to the mechanism embodying our invention, illustrated in Figs. 15–19. In these figures the record supply magazine has been indicated at A, the record turntable at B, the record discard magazine at C, and the tiltable guide rail at D.

The record playing end of the phonograph chassis is best shown in Fig. 15. It is important to notice in this figure that the entire plane of operation of the machine is tilted away from the vertical, so that the various shafts, axes, and fulcrums involved in the machine, while remaining parallel to one another, are all tilted upwardly somewhat from the horizontal. The driving motor is indicated by the rectangle 20 and may be of any conventional type. This motor is mounted rigidly upon a frame 22 which encompasses the mechanism of the phonograph and is itself rigidly mounted on a base plate 24 supported upon longitudinal bars 26. The motor 20 is used for rotating the record to be played, and for energizing the record changing operation, and is therefore preferably arranged to operate continuously during the operation of the phonograph. The drive shaft 28 of the motor has mounted at the end thereof a clamping member 30 which is provided with suitable facing to frictionally engage the center or ungrooved portion of a record and to rotate the same. Clamping means 30, drive shaft 28, and motor 20, are all axially fixed in place.

Drive shaft 28 is provided with a pinion 32 constantly meshing with a gear 34. Gear 34 carries a crown gear 36 serving to drive gears 38 and 40, the motion of which is used for actuating suitable trip mechanism for initiating the record changing operation at the end of a record and for restoring the trip mechanism and the reproducer 42 preparatory to the playing of another record. Inasmuch as this mechanism forms no part of the present invention and is not claimed herein, it will not be described in detail, being disclosed and claimed in the application of Lester L. Jones and Thomas E. Piazze, two of the inventors herein filed October 31, 1930, Ser. No. 492,456, now Patent 1,943,038, granted January 9, 1934. This mechanism makes use of a mechanical principle more generally described in copending application of Thomas E. Piazze, Ser. No. 393,359, filed September 18, 1929. For the purposes of the present disclosure it will be sufficient to observe that the reproducer 42, indicated in broken lines, is supported at the end of a reproducer arm 44 oscillatable about a shaft 46 for movement toward and from the record, while it may be reciprocated across the face of the record by moving longitudinally along the shaft 46. This shaft is preferably a smooth shaft kept in continuous rotation so as to offer no frictional resistance to a slow or gradual longitudinal movement of the reproducer along the same, at a speed equivalent to normal reproducer travel, and it is preferably inclined downwardly in the direction of the center of the record so that the reproducer, if stationary as when on the blank margin of a record, is urged in the playing direction. It should also be observed that the reproducer arm 44 is provided with an integral depending stop member 48 which, by engaging a shaft 50, prevents the reproducer from following the record more than a slight amount when the turntable B is retracted, and in passing, it may be mentioned that the shaft 50 is appropriately threaded to carry the reproducer back to a position at the marginal edge of the next record to be played.

The record changing operation requires a reciprocation of turntable B and an oscillation of the guide rail D in proper time sequence. These movements are preferably obtained during a single revolution of a crank or cam disc 52. This disc is mounted co-axially with the constantly rotating gear 34, but is not rotatably connected with the gear. Cam disc 52 carries a cam roller 54, in which a clutch pin 56 is reciprocably mounted. Gear 34 is provided with a series of holes 35, (see Fig. 17), located for engagement with the end of clutch pin 56. The clutch pin is urged outwardly by a spring 58 until stopped by a ring 60 supported at the end of a bell crank lever 62 pivoted at 64. At the end of a record, suitable trip mechanism operates to oscillate bell crank lever 62 in a clockwise direction, thereby urging clutch pin 56 inwardly until it enters one of the holes in gear 34, whereupon disc 52 is carried around with gear 34. The clutch pin 56 is kept in engagement with gear 34 by the ring 60 for a single revolution, at which time the clutch pin is released and retracted by the spring 56 through the operation of mechanism disclosed in greater detail in the copending application above referred to. For the present disclosure it need only be kept in mind that disc 52, which operates the record changing mechanism, is given a single rotation by appropriate single revolution clutch means, at the end of the playing of a record.

Turntable B is mounted on a shaft 70 which is freely rotatable and reciprocable in a fixed bearing 72 forming a part of the frame 22. The lower end of shaft 70 is suitably housed in a bearing 74 to provide for reciprocation of the shaft while permitting free rotation of the same. The bearing 74 is affixed to bell crank arm 76 pivoted at 78. The other arm 80 of the bell crank lever is disposed beneath the lower end of a reciprocable plunger 82 housed in a U-shaped bearing 84 affixed to the frame 22. It is evident that depression of the plunger 82 oscillates bell crank 76, 80 in a clockwise direction, thereby advancing the turntable B toward clamp means 30, and, conversely, elevation of plunger 82 permits turntable B to recede from clamping means 30 to the broken line position B'. A cushioning washer 86 may be located between bearing 72 and table B to prevent noise when the table is retracted.

The single revolution disc 52 is used to cause the desired reciprocation of table B, and how this is done may best be understood by reference to Figs. 15, 16, and 17, in which it will be observed that the upper end of plunger 82 is connected by a pin 88 to an arm 90 which is itself freely rotatable about a pin 8. During the playing of a record, the parts of the phonograph are in the position indicated in Fig. 16 in which the cam roller 54 is in its lowermost position and rides against arm 90, which in turn depresses the plunger 82 and therefore keeps the turntable B advanced toward clamping disc 30. At the end of a record, suitable trip mechanism actuates single revolution clutch mechanism, as was before explained, to cause the disc 52 to rotate with gear 34 over a single revolution. During the first part of the resulting clockwise rotation of disc 52 and cam roller 54, the arm 90 is permitted to rise, as is indicated in Fig. 17, and thus permits the turntable B to move back to the broken line position B' shown in Fig. 15. It will be evident from an inspection of Fig. 17 that the turntable will be left in retracted position during most of the single rotation of disc 52 and therefore during most of the record changing operation. Near the end of the rotation of disc 52 the cam roller 54 again engages the arm 90 and depresses it to the position shown in Figs. 15 and 16, thereby advancing the turntable toward the clamping means 30.

The guide rail D is essentially similar to that which was schematically illustrated in Figs. 4–14. It is oscillatable about a bearing pin or spindle 8, and carries a central guide or fin 10 and a rear guide or fin 12. In addition, an end stop 92 is attached to the guide rail in proper position to arrest downward movement of a record beyond the desired position in front of the turntable, when the rail is properly positioned, as is later explained, for the record loading operation. The guide rail D tends always to oscillate to the normal resting position indicated in Fig. 16 by reason of either, or as in the present case, both of two expedients, first, the center of gravity of the guide rail being located toward the turntable end thereof, and second, a coil spring 93, best shown in Figs. 15 and 19, so wound as to constantly urge the guide rail clockwise, as viewed in Figs. 16 and 17, into the normal playing position.

A cam follower arm 94 is arranged to oscillate integrally with guide rail D, preferably by reason of both the guide rail and the arm 94 being keyed to the spindle 8 by pins 95, best shown in Fig. 19. The end of cam follower arm 94 is appropriately curved and shaped, as is indicated at 96, to obtain the desired timing and rapidity of oscillation of the rail D. In a general way, it is evident from an inspection of Figs. 16 and 17 that cam roller 54 does not begin to raise the arm 94 until after the arm 90 has been elevated, or in other words, the guide rail D is not tilted to cause the played record to roll downwardly into the discard magazine until after the table has been completely retracted, thereby freeing the record and clearing the path of the guide rail to permit the turntable end thereof to rise without striking the turntable. During the second half of the revolution of cam roller 54, the guide rail is again permitted to tilt downwardly toward the turntable, thus causing a new record to be played, to be transferred to a position between the turntable and the clamping member, after which the cam roller 54 engages the arm 90 and causes the turntable to advance and clamp the record between it and the clamping member 30.

The arm 94, besides tilting guide rail D also operates means for ejecting or separating a record from the record supply magazine A and transferring it onto the magazine end of the guide rail, and to this end it is provided with an integrally depending finger 98. This is arranged to oscillate in the path of an upstanding lug 100 provided at the end of a link 102, the other end of which is connected at 104 to an arm 106 which oscillates about a fixed bearing 108. The arm 106 carries an upwardly directed ejector finger 110 located beneath the first record in the supply magazine. When arm 94 is elevated, the magazine end of guide rail D is lowered, and at the same time ejector finger 110 is elevated to separate the first record from the magazine and permit it to descend onto the depressed end of guide rail D.

Referring now to Fig. 18, one or more records to be played are loaded through an entrant slot 112, indicated in broken lines, into the supply magazine A, whereupon they slide downwardly in the magazine into collateral relation, as is indicated by the stack of records 114. Additional records may be placed in the magazine at any time during the operation of the phonograph, in any desired number and in any desired order. If preferred, only a single record may be placed in the magazine and automatically loaded, played, and discarded, the phonograph then being used for the playing of a single record like an ordinary phonograph, except that the loading and playing operation is entirely automatic.

The records slide downwardly in the magazine by reason of the sloped bottom 116, until stopped by fingers 118 located at either side of the ejector finger 110. The upper edge of the record is supported by an arched band 120.

When the phonograph is placed in operation, the single revolution clutch is actuated, and disc 52 goes through a revolution. During this revolution the magazine end of guide rail D is lowered to the position indicated in Figs. 17 and 18, and ejector finger 110 is raised. At this time, fingers 118, which are mounted on a plate 122 urged counter-clockwise by a weight 124, move beneath the lower edge of the record. As ejector finger 110 is lowered, the record rests upon the upper inclined faces of the fingers 118 and is thereby skidded onto the then rising guide rail D, where it rests against the fin 10 and an upper guide rail 10', as is indicated by the broken line position of the record 6. The guide rail D is then oscillated to the position indicated in Fig. 16 whereupon the record rolls down the guide rail to the broken line position 6' in Fig. 16. During the descent of the record, it leaves the guidance of the lower fin 10 by reason of the termination of this fin partway along the rail, as is evident from the drawings, and leaves the upper guide 10' because of the upward slope of this guide. The record is therefore free to lean against the rear fin 12 of the guide rail D and the upper guide 12', as is indicated by the broken line position 6' in Fig. 15.

At this time, the turntable B is advanced from the position B', and during this advance, the record is preferably not only clamped but also centered, in order to avoid eccentric rotation. This may most simply be accomplished by providing either the clamping member 30, or, as in the present case, the turntable B, with a centering pin 130, preferably formed at the end of shaft 70. The end of the centering pin is tapered, and this taper may be taken advantage of to slightly elevate the record from the guide rail D as the centering pin is advanced into the center hole of the record. When the turntable is advanced further, the centering pin enters a suitable recess or opening 132 in the clamping member 30, thereby permitting the record, then in the position 6", to be clamped tightly and at the same time to be brought into rotation. The record is also preferably brought into engagement with the reproducer 42 at the same time, the reproducer having been meanwhile positioned with its stylus opposite the blank outer margin of the record so that the reproducer may gently travel toward the center of the record until it enters the first sound groove thereof.

In the present machine the separation of the record from the guide rail D during the advance of the turntable is insured by the following additional mechanical means. The bell crank arm 80 is provided with an upstanding pin 134 carrying a cushion mushroom tip 136. When the guide rail D first tilts downwardly toward the turntable, it rests upon the tip 136 when the latter is in the broken line position 136', as is most clearly shown in Fig. 15. In this position the center hole of the record is above the centering pin 130. When bell crank 76, 80 is oscillated clockwise to advance the centering pin 130 and turntable B, the mushroom tip 136 descends. During this descent, centering pin 130 enters the center hole of the record, and thereafter, further advance of the turntable is accompanied by further descent of the mushroom tip 136 and guide rail D, thereby insuring plenty of clearance between the record and the guide rail when the record is being played. When the record is being unloaded, guide rail D is raised during the retraction of the turntable, by the same mechanism, which prevents appreciable drop and accompanying noise of the record.

As was previously mentioned, when the record has been completed, appropriate automatic trip means, not shown, makes the single revolution clutch mechanism operative to again put the machine through a record changing cycle. In this cycle, the turntable is retracted, thereby first disengaging the record from the reproducer, and slightly elevating guide rail D, after which the record is retained by supporting fins 12 and 12', while the turntable and centering pin are completely disengaged from the record. The guide rail is next tilted downwardly toward the supply and discard magazines, whereupon the record rolls downwardly, as is indicated by the position 6" in Fig. 17. The lower fin 12 and the bottom of the discharge track of the guide rail terminate just before the discard magazine C, and the upper guide 12' is cut away, as at 140, thereby permitting the discharged record to leave the guides and enter the discard magazine. The record immediately slides to the opposite end of the discard magazine, as is best indicated by the successive positions 6" and 6"' in Fig. 8, because of a downward slope given to the supporting rails 14, 14, which slope may be effectively increased by spreading the rails apart, as indicated in Fig. 17. The used records are stacked up in the discard magazine in the manner indicated by the group of records 142. These records may be removed by means of a door at the side of the phonograph cabinet, and alongside of the entrant slot 112, giving access to the discard magazine.

If it is desired to repeat a record which has just been played, one or any number of times, it is necessary to prevent the record from rolling into the discard magazine and to prevent a new record from being separated from the supply magazine. For this purpose, record repeat mechanism is provided, as is best indicated in Fig. 19. A rod 150 is arranged for reciprocation under manual control at the front of the phonograph cabinet. The rear end of rod 150 carries a plate 152 provided with a pin 154 arranged over the fin 12 of the tiltable guide rail D. The rod 150 is also provided with a pair of collars 156 between which the link 102 of the ejector mechanism is supported. By pulling the rod 150 outwardly, the members 154 and 100 are moved from the solid to the dotted line positions 154', 100'. Stop 154 then operates to prevent the used record from rolling down the guide rail into the discard magazine, and the lug or hook 100 is moved out of the path of its actuating finger 98 so that no new record is ejected from the supply magazine. As long as the parts are left in the dotted line position, the record will be repeated over and over again, until the repeat rod 150 is restored to its normal position, thereby permitting the phonograph to function for automatic record changing.

The mode of constructing and operating, and the many advantages of our automatic phonograph will, it is believed, be apparent from the foregoing detailed description thereof. A single level machine is provided which is exceedingly compact and yet capable of handling a large number of records. The record changing operation and the mechanism for accomplishing the same are simplified by transferring the record by rolling it down an inclined guide rail and by playing the record in a substantially upright position. At the same time, sufficient inclination is employed during the transfer and during the playing of the record to enable the record to be retained in desired position by gravity during the various phases of the record changing operation and to permit of gravity attraction of the reproducer toward the record. The record changing operation may be accomplished rapidly because of the fact that stopping rotation of the record, disengaging the record from the reproducer, and disengaging the turntable from the record, or their converse, are all accomplished in a single movement. A single driving motor is used both for record rotation and record changing operation, and this motor is fixed in position and may be of any desired type.

It will be apparent that while we have shown and described our invention in the preferred form, many changes and modifications may be made in the structure disclosed without departing from the spirit of the invention, defined in the following claims.

We claim:

1. An automatic phonograph comprising a record turntable having a centering pin, a clamping member, a motor for constantly rotating the clamping member, and means for moving the record turntable with a record mounted on the centering pin thereof directly into or out of frictional engagement with the clamping member in order to start or stop rotating the record.

2. An automatic phonograph comprising a record turntable, a clamping member, a motor for constantly rotating the clamping member, a reproducer, and means for moving the turntable with a record thereon directly into engagement with the clamping member and the reproducer in order to begin rotation and reproduction of the record.

3. An automatic phonograph comprising a record turntable, a clamping member, a motor for driving the clamping member, a reproducer, means for relatively moving the turntable and a record in order to load the record onto the turntable, and means for moving the turntable and record into playing engagement with the clamping member and the reproducer.

4. An automatic phonograph comprising a freely rotatable record turntable, a clamping member, a motor for driving said clamping member, a reproducer, means for positioning a record to be played between the turntable and the clamping member, means for advancing the turntable and the record into engagement with the clamping member and the reproducer, means for retracing the turntable when the record has been played in order to disengage the record from the clamping member and the reproducer, and means for removing the record from its position between the turntable and the clamping member.

5. An automatic phonograph comprising a record turntable having a centering pin fixedly mounted thereon, a clamping member, a motor for constantly rotating the clamping member, means for positioning a record to be played between the turntable and the clamping member, means for advancing the turntable and with it the centering pin into the center hole of the record and for advancing the turntable and record into engagement with the clamping member, means for retracting the turntable and with it the centering pin when the record has been played, and means for removing the record from its position between the turntable and the clamping member.

6. An automatic phonograph comprising a record turntable, a centering pin, a clamping member, a driving motor for constantly rotating the clamping member, a reproducer, means for rolling a record to be played into position between the turntable and the clamping member, means for advancing the centering pin into the center hole of the record and for advancing the turntable and record directly into engagement with the clamping member and the reproducer, means for retracting the turntable and the centering pin when the record has been played, and means to roll the record away from its position between the turntable and the clamping member.

7. An automatic phonograph comprising a record magazine, a turntable, a clamping member, a reproducer, means for separating a record from the record magazine in a substantially upright position, means causing the record to roll to a position between the turntable and the clamping member, means to advance the turntable and record directly into engagement with the clamping member and the reproducer, means to retract the record and turntable at the end of the record, and means causing the record to roll into a record magazine.

8. An automatic phonograph comprising a record magazine, a turntable, a clamping member, a motor for constantly rotating the clamping member, means for separating a record from the supply magazine in a substantially upright position, means causing the record to roll downwardly by gravity to a position between the turntable and the clamping member, means to advance the turntable and record directly into engagement with the clamping member, means to retract the record and turntable at the end of the record, and means causing the record to roll downwardly by gravity into a record magazine.

9. An automatic phonograph comprising a record supply magazine, a turntable, a clamping member, a motor for constantly rotating the clamping member, a reproducer, a record discard magazine, means for separating a record from the supply magazine in a substantially upright position, means causing the record to roll downwardly by gravity to a position between the turntable and the clamping member, means to advance the turntable and record directly into engagement with the clamping member and the reproducer, means to retract the record and turntable at the end of the record, and means causing the record to roll downwardly by gravity into the discard magazine.

10. An automatic phonograph comprising a freely rotatable record turntable having an axis inclined upwardly from the horizontal, a clamping member having a similarly inclined axis, a motor for constantly rotating the clamping member, means for reciprocating the table toward and from the clamping member, a reproducer alongside of the clamping member movable across the face of the table and toward and from the table and so balanced as to tend normally to gravitate toward the turntable, and stop means limiting the movement of the reproducer with the turntable in order to disengage the reproducer from a record carried by the turntable when the table is retracted from the clamping member, the retraction of the turntable from the reproducer being the sole movement for physically disengaging the reproducer from the record between the playing of successive records.

11. An automatic phonograph comprising a record guiding rail, a record supply magazine, a record discard magazine, a record turntable located at one side of the rail, a clamping member and reproducer located at the opposite side of the rail, means for so tilting the rail as to guide a record from the supply magazine to the turntable or from the turntable to the discard magazine, and means for relatively moving the turntable and the clamping member transversely of the rail in order to clamp a record therebetween.

12. An automatic phonograph comprising a record guiding rail, a record supply magazine, a record discard magazine, a record turntable located at one side of the rail, a clamping member and a reproducer located at the opposite side of the rail, a motor for rotating the clamping member, means for so tilting the rail as to guide a record from the supply magazine to the turntable or from the turntable to the discard magazine, and means for moving the turntable transversely of the rail in order to bring the record into or out of engagement with the clamping member and the reproducer.

13. An automatic phonograph comprising a record guiding rail, a record supply magazine located at one side of one end of the rail, a record discard magazine located at the opposite side of the same end of the rail, a record turntable located at one side of the second end of the rail, a clamping member located at the opposite side of the second end of the rail, means for so tilting the rail as to guide a record from the supply magazine to the second end of the rail or from the second end thereof to the discard magazine, and means for relatively moving the turntable and the clamping member transversely of the rail in order to clamp a record therebetween.

14. An automatic phonograph comprising a record guiding rail, a record supply magazine located at one side of one end of the rail, a record discard magazine located at the opposite side of the same end of the rail, a freely rotatable record turntable located at one side of the second end of the rail, a clamping member and a reproducer located at the opposite side of the second end of the rail, a motor for driving said clamping member, and means for moving the turntable transversely of the rail in order to bring a record at the second end thereof into or out of engagement with the clamping member and the reproducer.

15. An automatic phonograph comprising a record guiding rail, a record supply magazine located at one side of one end of the rail, a record discard magazine located at the opposite side of the same end of the rail, a record turntable located at one side of the second end of the rail, a clamping member and a reproducer located at the opposite side of the second end of the rail, a motor for rotating the clamping member, means for so tilting the rail as to guide a record from the supply magazine to the second end of the rail or from the second end thereof to the discard magazine, and means for moving the turntable transversely of the rail in order to bring a record at the second end thereof into or out of engagement with the clamping member and the reproducer.

16. An automatic phonograph comprising a turntable, a record supply magazine, a record discard magazine, a record guiding rail for guiding a record and causing the same to roll gravitationally upon its edge from the supply magazine to the turntable or from the turntable to the discard magazine, said turntable being located at one side of the guide means, a clamping member located at the opposite side of the guide means, and means for relatively moving the turntable and the clamping member transversely of the rail in order to clamp a record therebetween.

17. An automatic phonograph comprising a turntable, a record magazine, a record guiding rail for guiding a record and causing the same to roll gravitationally upon its edge from the magazine to the turntable or from the turntable to a magazine, said turntable being located at one side of the rail, a clamping member and a reproducer located at the opposite side of the rail, a motor for rotating the clamping member, and means for moving the turntable transversely of the rail in order to bring the record into or out of engagement with the clamping member and the reproducer.

18. An automatic phonograph comprising a freely rotatable record turntable having a centering pin, a clamping member, a motor for driving said clamping member, means for positioning a record to be played between the turntable and the clamping member, means for advancing the turntable and with it the centering pin into the center hole of the record and for advancing the turntable and record into engagement with the clamping member, means for retracting the turntable and with it the record when the record has been played in order to separate the record from the clamping member, means for arresting further movement of the record in order to permit separation of the turntable and centering pin from the record, and means for removing the record from its position between the turntable and the clamping member.

19. An automatic phonograph comprising a record turntable having a centering pin, a clamping member, a motor for constantly rotating the clamping member, a reproducer, means for positioning a record to be played between the turntable and the clamping member, means for advancing the turntable and with it the centering pin into the center hole of the record and for advancing the turntable and record into engagement with the clamping member and reproducer, means for retracting the turntable and with it the record when the record has been played in order to separate the record from the clamping member and the reproducer, means for arresting further movement of the record in order to permit separation of the turntable and centering pin from the record, and means for removing the record from its position between the turntable and the clamping member.

20. An automatic phonograph comprising a nearly upright record turntable having a centering pin the axis of which is inclined upwardly slightly from the horizontal, a clamping member the axis of which is similarly inclined, a motor for constantly rotating the clamping member, a reproducer, means for positioning a record to be played between the turntable and the clamping member, means for advancing the turntable and with it the centering pin into the center hole of the record and for advancing the turntable and record into engagement with the clamping member and reproducer, means for retracting the turntable and with it the record when the record has been played in order to separate the record from the clamping member and the reproducer, means for arresting further movement of the record in order to permit separation of the turntable and centering pin from the record, and means for removing the record from its position between the turntable and the clamping member.

21. An automatic phonograph comprising a nearly upright record turntable the axis of which is inclined upwardly slightly from the horizontal, a clamping member the axis of which is similarly inclined, a motor for constantly rotating the clamping member, a reproducer located alongside of the clamping member and limitedly movable toward and from the turntable, and means for moving the turntable with the record thereon directly into engagement with the clamping member and the reproducer in order to begin rotation and reproduction of the record.

22. An automatic phonograph comprising a record magazine arranged to hold and support a stack of records in a nearly upright but somewhat inclined position, a turntable, a clamping member, means for separating a record from the record magazine in a nearly upright but somewnat inclined position, guide means for causing the record to roll on its edge in a nearly upright but somewhat inclined position to a position between the turntable and the clamping member, means to advance the turntable and the record directly into engagement with the clamping member, means to retract the turntable and record at the end of the record, and guide means causing the record to roll on its edge in a nearly upright but somewhat inclined position into a record magazine.

23. An automatic phonograph comprising a record magazine arranged to hold and support a stack of records in a nearly upright but somewhat inclined position, a turntable, a clamping member, a reproducer, means for separating a record from the record magazine in a nearly upright but somewhat inclined position, guide means for causing the record to roll on its edge in a nearly upright but somewhat inclined position to a position between the turntable and the clamping member, means to advance the turntable and the record directly into engagement with the clamping member and the reproducer, means to retract the turntable and record at the end of the record, and guide means causing the record to roll on its edge in a nearly upright but somewhat inclined position into a record magazine.

24. An automatic phonograph comprising a record magazine arranged to hold and support a stack of records in a nearly upright but somewhat inclined position, a turntable, a clamping member, a reproducer, means for separating a record from the record magazine in a nearly upright but somewhat inclined position, guide means for causing the record to roll on its edge in a nearly upright but somewhat inclined position to a position between the turntable and the clamping member, means to advance the turntable and the record directly into engagement with the clamping member and the reproducer, means to retract the turntable and record at the end of the record in order to separate the record from the clamping member and reproducer, means for arresting further movement of the record in order to permit separation of the turntable and record, and guide means causing the record to roll on its edge in a nearly upright but somewhat inclined position into a record magazine.

25. An automatic phonograph comprising a turntable, a record magazine arranged to hold and support a stack of records in a nearly upright but somewhat inclined position, record guiding means for guiding a record and causing the same to roll gravitationally upon its edge in a nearly upright but somewhat inclined position from the magazine to the turntable or from the turntable to a magazine, said turntable being located at one side of the guide means, a clamping member and a reproducer located at the opposite side of the guide means, a motor for rotating the clamping member, and means for moving the turntable transversely of the guide means in order to bring the record into or out of engagement with the clamping member and the reproducer.

26. An automatic phonograph comprising a turntable, a record magazine arranged to hold and support a stack of records in a nearly upright but somewhat inclined position, record guiding means for guiding a record and causing the same to roll gravitationally upon its edge in a nearly upright but somewhat inclined position from the magazine to the turntable or from the turntable to a magazine, said turntable being located at one side of the guide means in a nearly upright position with its axis inclined upwardly slightly from the horizontal, a clamping member and a reproducer located at the opposite side of the guide means, the axis of said clamping member being inclined similarly to that of the turntable, a motor for rotating the clamping member, and means for moving the turntable transversely of the guide means in order to bring the record into or out of engagement with the clamping member and the reproducer.

27. An automatic phonograph comprising a turntable, a record magazine arranged to hold and support a stack of records in a nearly upright but somewhat inclined position, record guiding means for guiding a record and causing the same to roll gravitationally upon its edge in a nearly upright but somewhat inclined position from the magazine to the turntable or from the turntable to a magazine, said turntable being located at one side of the guide means in a nearly upright position with its axis inclined upwardly slightly from the horizontal, a clamping member and a reproducer located at the opposite side of the guide means, the axis of said clamping member being inclined similarly to that of the turntable, a motor for rotating the clamping member, means for advancing or retracting the turntable transversely of the guide means in order to bring the record into or out of engagement with the clamping member and the reproducer, and means for separating the played record from the turntable during retraction of the turntable.

28. An automatic phonograph comprising a record magazine, a clamping member, a reproducer, record loading means including means to advance the turntable and a record positioned in front of the same directly into engagement with the clamping member and the reproducer, and means to retract the turntable and record at the end of the record, record transfer means including means for separating a record from the record magazine and guiding the same to a position in front of the turntable, and means for guiding a record after retraction of the turntable to a magazine, and record repeat mechanism arranged to make the aforesaid transfer means inoperative at will.

29. An automatic phonograph comprising a record magazine arranged to hold and support a stack of records in a nearly upright but somewhat inclined position, a turntable, a clamping member, a reproducer, record loading means including means to advance the turntable and a record positioned in front of the same directly into engagement with the clamping member and the reproducer, and means to retract the turntable and record at the end of the record, record transfer means including means for separating a record from the record magazine in a nearly upright but somewhat inclined position, guide means for causing the record to roll on its edge in a nearly upright but somewhat inclined position to a position in front of the turntable, and guide means for causing a record after retraction of the turntable to roll on its edge in a nearly upright but somewhat inclined position into a record magazine, and record repeat mechanism arranged to make the aforesaid record transfer means inoperative at will.

LESTER L. JONES.
JOSEPH JONES.
THOMAS E. PIAZZE.